(12) United States Patent
Smyers

(10) Patent No.: US 10,813,300 B2
(45) Date of Patent: Oct. 27, 2020

(54) ARTICULATING BLOWER NOZZLE

(71) Applicant: Joseph Scott Smyers, Chardon, OH (US)

(72) Inventor: Joseph Scott Smyers, Chardon, OH (US)

( * ) Notice: Subject to any disclaimer, the term of this patent is extended or adjusted under 35 U.S.C. 154(b) by 387 days.

(21) Appl. No.: 15/480,017

(22) Filed: Apr. 5, 2017

(65) Prior Publication Data

US 2017/0280630 A1    Oct. 5, 2017

Related U.S. Application Data

(60) Provisional application No. 62/318,506, filed on Apr. 5, 2016.

(51) Int. Cl.
*A01G 20/43* (2018.01)
*A01G 20/47* (2018.01)
*A47L 9/08* (2006.01)
*A47L 5/14* (2006.01)

(52) U.S. Cl.
CPC ............. *A01G 20/43* (2018.02); *A01G 20/47* (2018.02); *A47L 5/14* (2013.01); *A47L 9/08* (2013.01)

(58) Field of Classification Search
CPC  A01G 20/43; A01G 20/47; A47L 9/08; A47L 5/14
See application file for complete search history.

(56) References Cited

U.S. PATENT DOCUMENTS

| | | | |
|---|---|---|---|
| 9,332,694 B2 | 5/2016 | Prager | |
| 9,420,924 B2 | 8/2016 | Svoboda et al. | |
| 2012/0234412 A1* | 9/2012 | Prager | E01H 1/0809 137/565.01 |
| 2013/0298351 A1 | 11/2013 | Romito | |
| 2015/0373922 A1 | 12/2015 | Romito | |

* cited by examiner

*Primary Examiner* — Andrew A Horton
(74) *Attorney, Agent, or Firm* — Dunlap Bennett & Ludwig, PLLC; Brendan E. Squire

(57) ABSTRACT

An articulating blower nozzle that maintains directional orientation of a high velocity air flow while the blower is being swung by an operator. The dynamic nozzle blows the debris to a specific point while the blower is swung from side to side, thereby collecting the debris is a specific area without the operator having to constantly reorient their body to complete the work.

16 Claims, 5 Drawing Sheets

ARTICULATING BLOWER NOZZLE

CROSS-REFERENCE TO RELATED APPLICATION

This application claims the benefit of priority of U.S. provisional application No. 62/318,506, filed Apr. 5, 2016, the contents of which are herein incorporated by reference.

BACKGROUND OF THE INVENTION

The present invention relates to powered blowers, such as used for leaves and grass, and more particularly to an articulating nozzle for powered blowers.

Blowers typically used to blow yard debris, such as leaves and grass, etc. To clean up lawns and parking lots tend to blow the material in an arc that diverges from the operator, thereby making it difficult to blow the debris to a common location for collection.

Typical blowers used to blow leaves and grass have a fixed nozzle orientation and do not permit dynamic aiming of the nozzle tip. Consequently, these blowers rely on the operator changing the orientation of the blower towards the work being done, which increases the time required to clear the debris and leaves materials behind, which takes more time for the operator to go back over the area to finish the work.

As can be seen, there is a need for a dynamically articulating nozzle that blows the debris to a specific point even as the nozzle is swung from side to side, to collect the debris in a specific area without the operator having to constantly reorient their body to complete the work.

SUMMARY OF THE INVENTION

In one aspect of the present invention, an articulating nozzle for a blower, includes a movable nozzle that is configured to be pivotally connected to a fixed nozzle end of the blower. A drive mechanism is operably coupled to the movable nozzle to impart a deflection of the nozzle in a direction opposite that of a swinging arc movement of the blower. The articulating nozzle may also include a driving means operatively coupled to the drive mechanism and configured to be attached to a left side and a right side of a blower operator. The driving means may include a flexible drive belt or a drive cable. The drive mechanism may further be configured to orient the movable nozzle at a point of convergence throughout the swinging arc movement of the blower.

In some embodiments a coupling sleeve is provided wherein the movable nozzle is pivotally connected to a forward opening of the coupling sleeve and an aft opening of the coupling sleeve is configured to attach to the blower. An adjustment clip may be provided and configured to adjust a length of the driving means. The adjustment clip may be formed to include a spring biased retractor.

In other aspects of the invention, a blower nozzle adapter is provided. The blower nozzle adapter includes a coupling sleeve having a first opening configured to connect to a stationary nozzle of an operator carried blower tool. A movable nozzle is pivotally connected to a second opening of the coupling sleeve. A drive mechanism is operable to orient the movable nozzle at a point of convergence as the blower tool is operated in a swinging arc.

The adapter may also include a drive means configured to be operably connected between the drive mechanism and an operator of the blower tool. The drive means may be a belt or a cable. The drive means may also include a tension relief means for relieving the tension in the drive means at a limit of travel of the movable nozzle. The tension relief means may be a spring biased retractor operably coupled to at least one end of the drive means. Alternatively, the tension relief means may be a resilient arcuate drive guide.

In some embodiments, the drive mechanism may include a first drive gear carried on a pivot pin interconnecting the movable nozzle and the coupling sleeve. At least one second drive gear may be carried on a rod extending from an intermediate portion of the coupling sleeve. A pulley may be carried on the pivot pin and operatively coupled to the at least one first drive gear.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a system, method, and apparatus for providing an articulating nozzle for blower. The articulating nozzle automatically adjusts its orientation as a blower operator sweeps the blower in a side to side arc.

Figure 1:
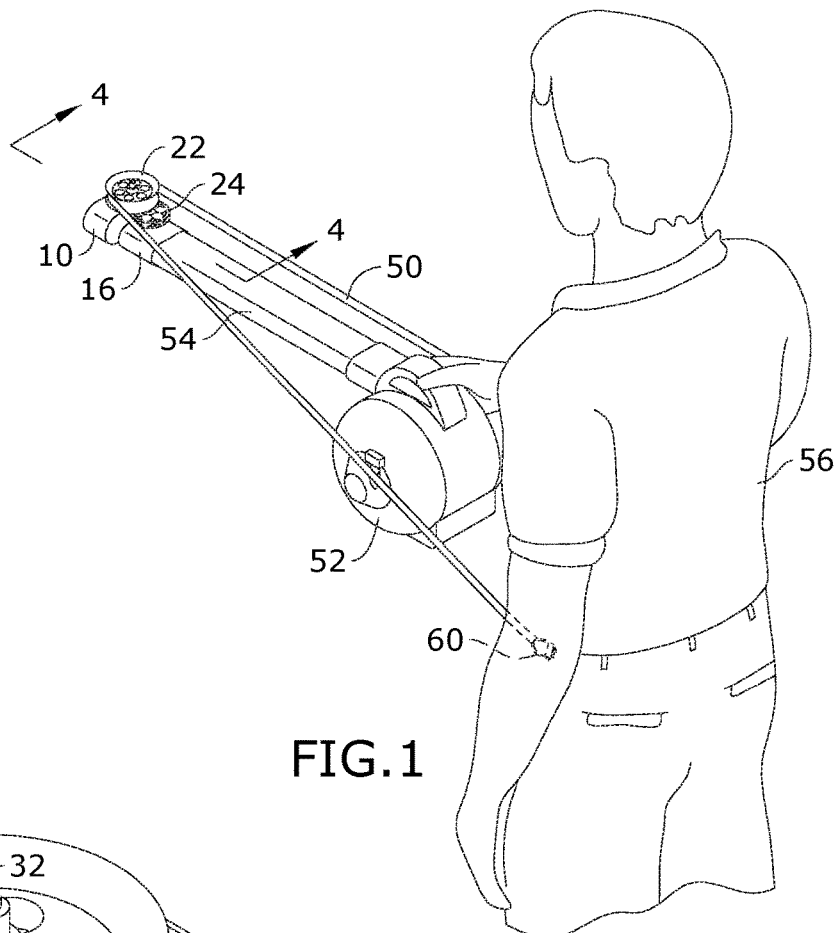
FIG. 1 is a perspective view of the direction adjusting blower nozzle, shown in use.
Figure 2:
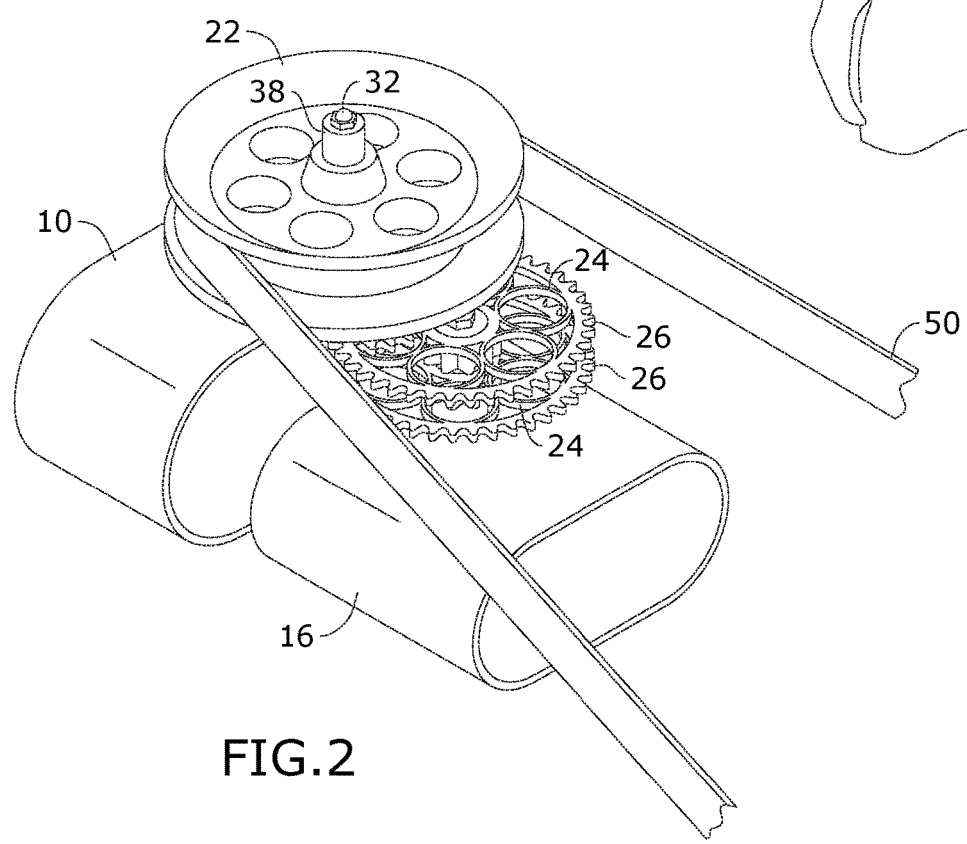
FIG. 2 is a perspective view of the direction adjusting blower nozzle.
Figure 3:
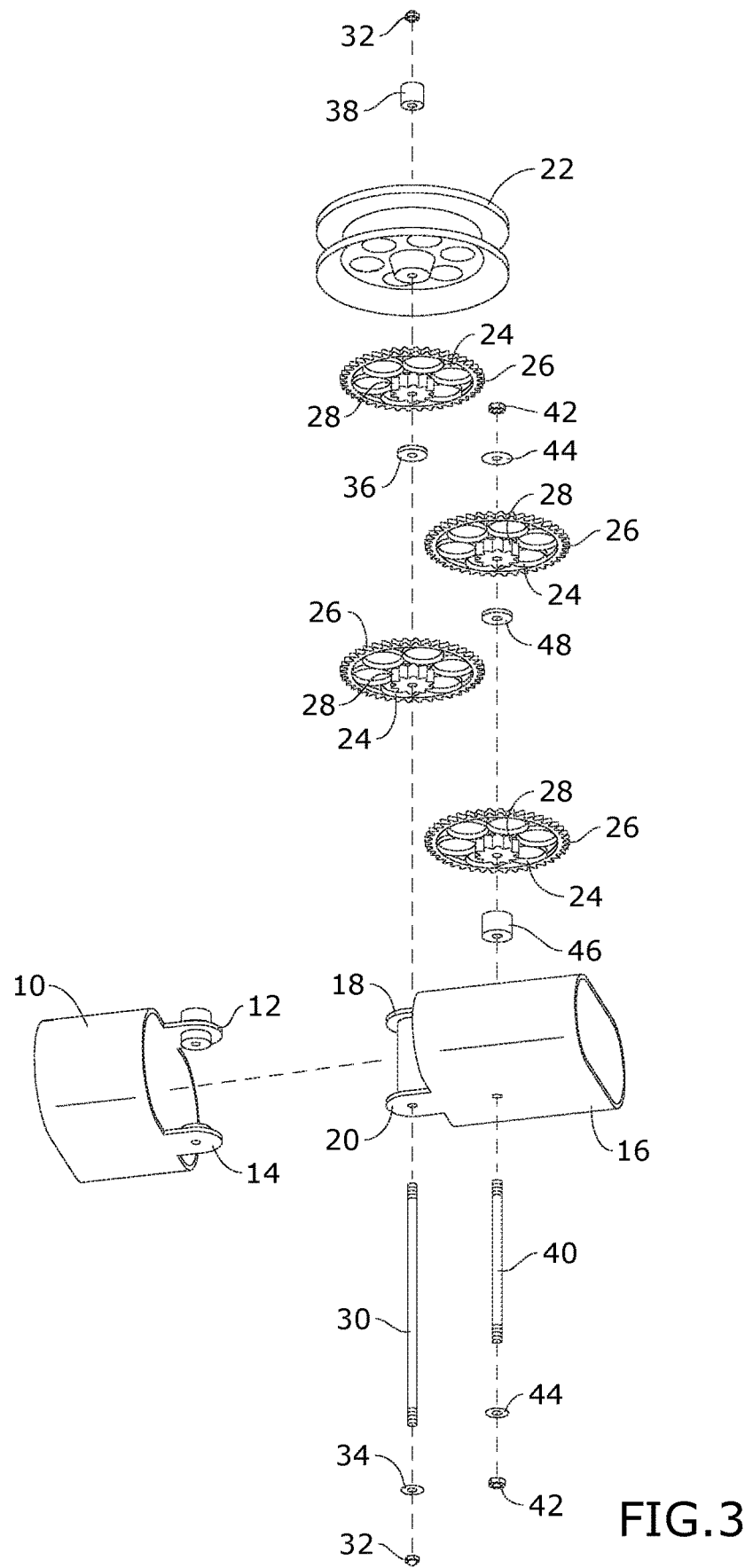
FIG. 3 is an exploded view of the nozzle, with belt 50 not shown for clarity.
Figure 4:
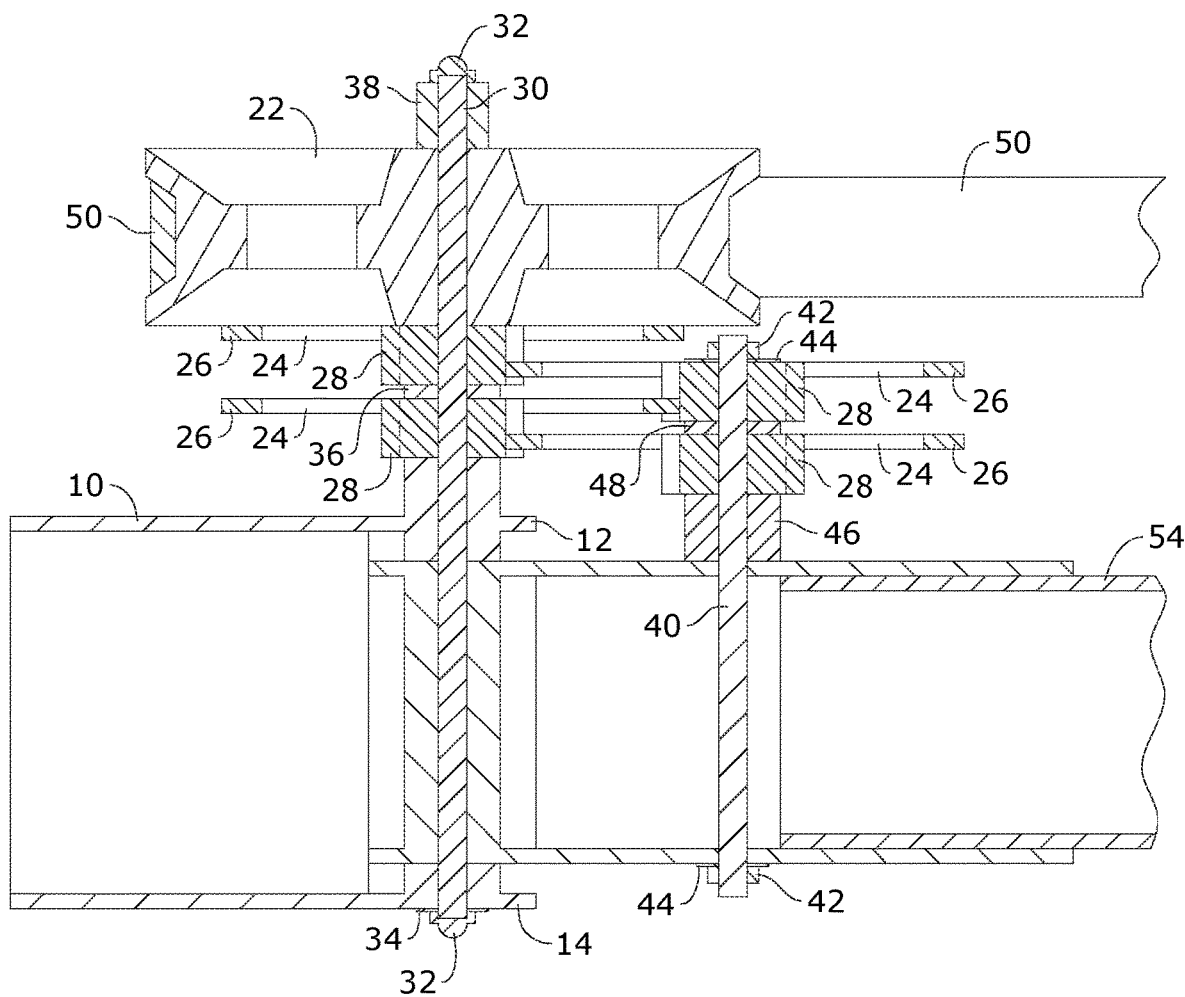
FIG. 4 is a section view of the nozzle, taken along line 4-4 in FIG. 1.

As seen in reference to FIG. 1, the automatically articulating blower nozzle 10 of the present invention is illustrated operatively coupled to a conventional blower 52. The blower 52 produces a high velocity airflow 58 that is directed by an operator 56 to blow debris, such as leaves and grass, etc. as an outdoor cleaning and landscaping implement.

In typical use conventional blowers 52 have a fixed nozzle 54 and the blower 52 is swung in an arc to blow the material for collection at a common point. With a fixed nozzle 54 the air flow is directed in an arc that diverges from the operator 56, making it difficult to blow the debris to a common location for collection. Since the operator 56 swings the nozzle in an arc, and the fixed nozzle 54 does not compensate for this movement, the debris is blown in a divergent manner, which defeats the purpose of trying to blow it to a specific location for collection. The operator 56 is required to either extend their arms to reorient the fixed nozzle 54 or must move their body, such as leaning or stepping laterally in order to corral the debris to a common location.

Figure 5:
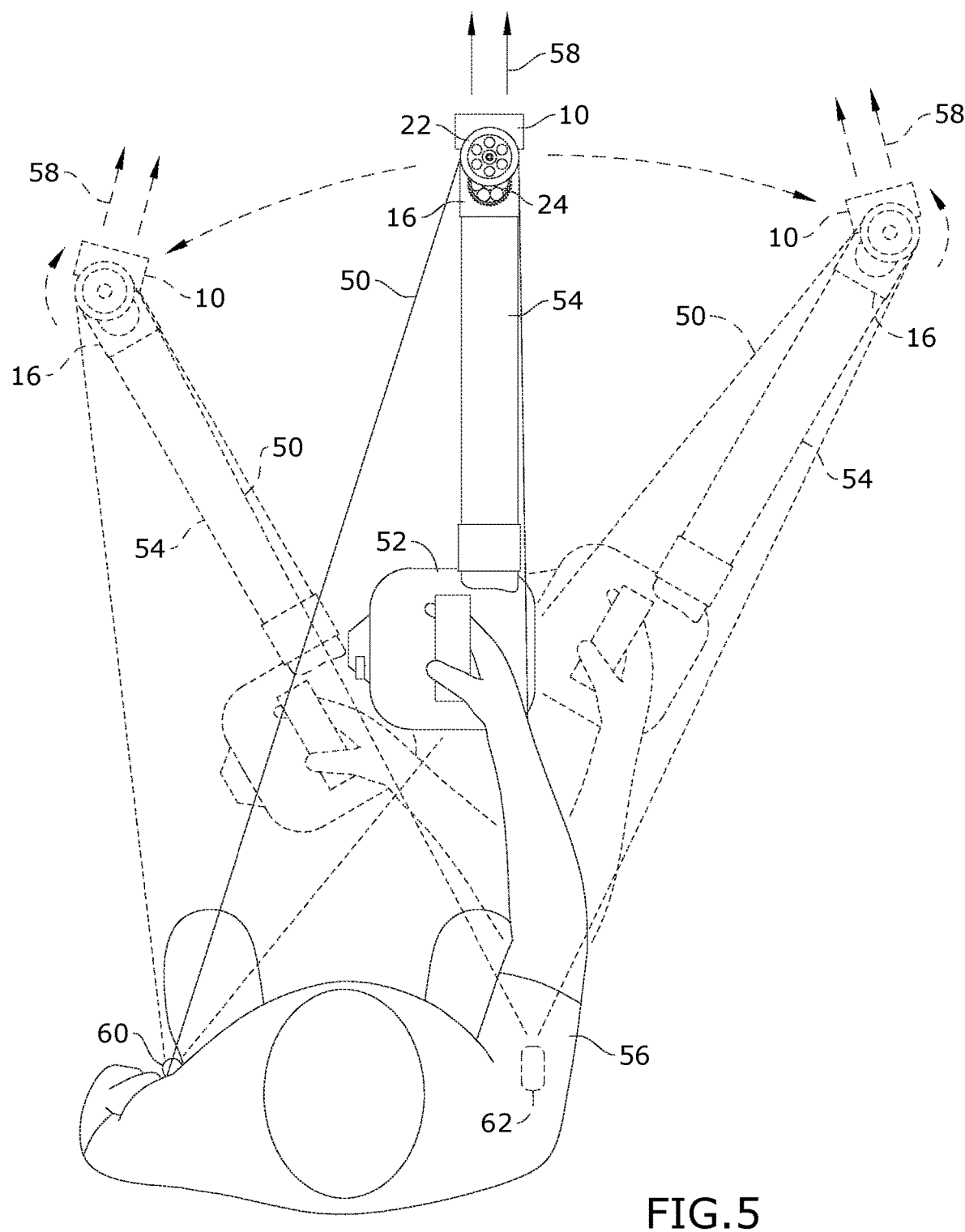
FIG. 5 is a top view of the nozzle, shown in use, illustrating the adjustment of nozzle 10 as the operator swings blower 52 in an arc.
Figure 6:
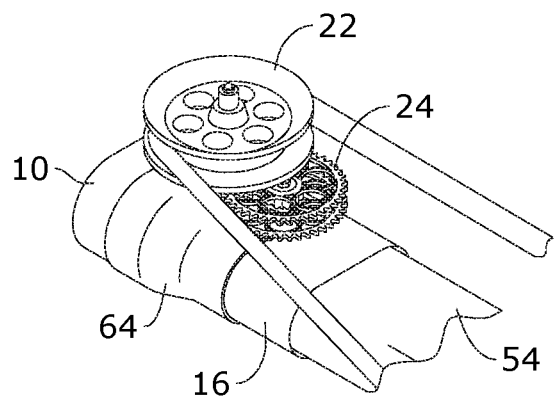
FIG. 6 is a perspective view of an embodiment of an articulating nozzle with a boot.
Figure 7:
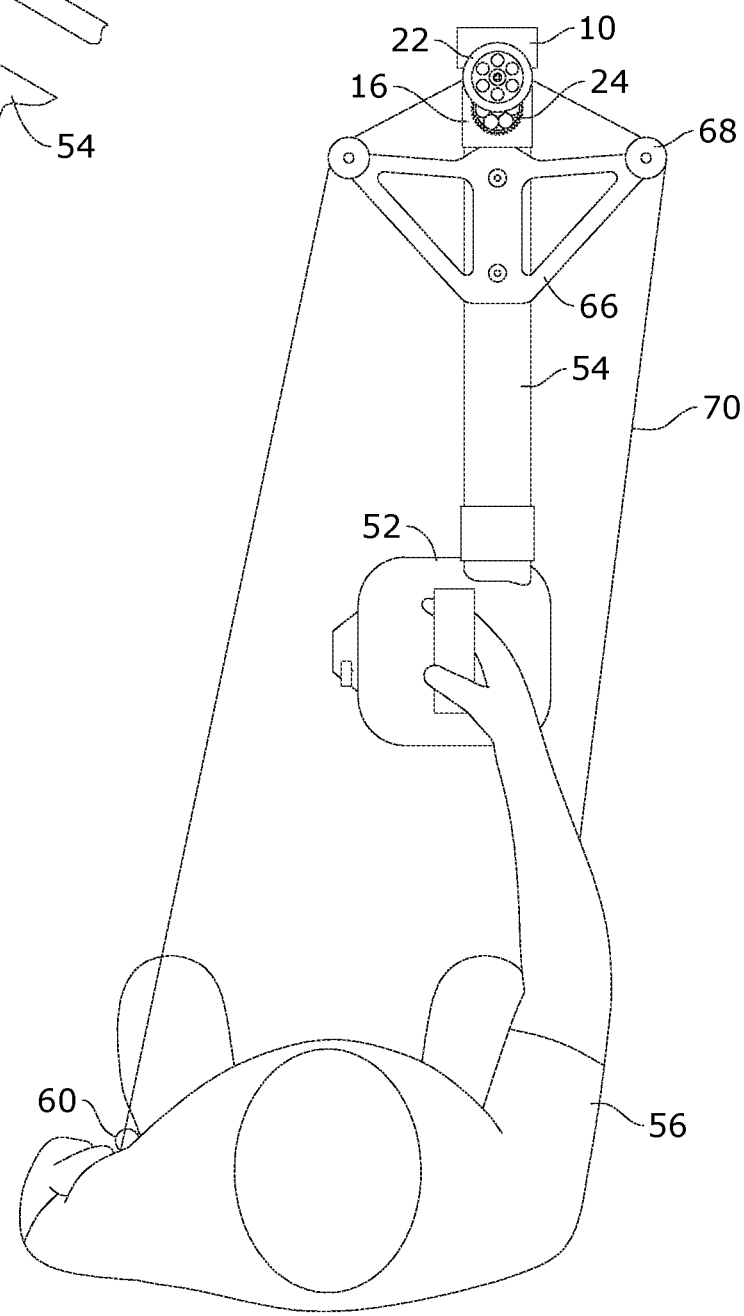
FIG. 7 is a top view of an embodiment of the articulating nozzle shown in use.

As further seen in reference to FIGS. 1 and 5, aspects of the present invention solve this problem in that the articulating nozzle 10 is able to maintain the exiting high velocity airflow 58 of the blower nozzle 54 oriented towards the desired convergent collection point as the blower 52 is swung in an arc from side to side by the operator 56. Accordingly, the leaves, grass or debris are blown in a convergent manner rather than divergent pattern of the prior art.

According to aspects of the invention, the orientation of the articulating nozzle 10 dynamically changes to maintain orientation towards a specific point of the operator's choosing. The dynamic nozzle 10 blows the debris to a specific point even as the nozzle is swung from side to side, collecting the debris is a specific area without the operator 56 having to constantly re-orient their body to the work.

The articulating nozzle 10 is pivotally attached to a coupling sleeve 16, which is in turn attached to the fixed nozzle portion 54 of the blower 52. The articulating nozzle 10 may be attached to the coupling sleeve 16 via any suitable pivoting arrangement that permits the articulating nozzle 10 to reorient laterally relative a longitudinal axis of the fixed nozzle 54. In the embodiment shown, the pivot may include a pivot pin 30 that extends vertically through an upper 12 and a lower 14 pivot tab that extend from an aft end opening of the articulating nozzle 10. A corresponding upper 18 and lower 20 coupler tabs extend from a forward end opening of the coupling sleeve 16. The respective pivot tabs 12, 14 and coupler tabs 18, 20 may also carry a bushing to support the pivotal rotation about the pivot pin 30. A fastener 32 such as a nut, pin, or cap may secure a washer 34 to the pivot pin to facilitate pivotal movement of the articulating nozzle 10 to the coupler 16.

A drive mechanism is operatively coupled to the articulating nozzle 10. The drive mechanism is connectable to the operator 56 via any suitable driving means 50, such as a belt, a cable, a wire, or a string. The driving means 50 is attached to the a left side and a right side of the operators 56 body, such that as the operator 56 translates the blower 52 in an arc, the driving means 50 moves the drive mechanism so that the articulating nozzle 10 remains oriented to direct the airflow 58 and blow the debris in a convergent manner.

In the embodiment shown, the drive mechanism may include a pulley 22 that is configured to carry the driving means 50 to position the articulating nozzle 10. The pulley 22 may be carried on the pivot pin 30 and is operatively coupled to a plurality of gears 24 that are configured to articulate the nozzle 10 in a direction opposite to that of the sweep of the arc and at a gear ratio that orients the nozzle 10 at a point of convergence throughout the sweep of the blower fixed nozzle 54 along the arc. A rod 40 may extend from an intermediate portion of the coupling sleeve 16 to carry one or more gears 24 of the drive mechanism. The gears 24 may include an outer toothed surface 26 and an inner toothed surface 28 having a substantially smaller diameter. The gears 24 may include one or more spacers 44, 48, 46.

A gap between the movable nozzle 10 and the fixed nozzle 54 allows the nozzle tips to move relative to each other. The gap may be covered by a flexible boot 64, or other sealing joint, such as a ball joint, which prevents the escape of the high velocity air stream 58 developed by the leaf blower 52.

The drive belt 50 may extend laterally from the drive mechanism and may be routed around or otherwise attached to the operator 56, such as shown in reference to FIGS. 1 and 5. The drive belt 50 may include an adjustment clip 60 that may be used to make the drive belt 50 the correct length relative to an arm length and size of the operator 56 and that of the stationary nozzle 54. In other embodiments the drive belt or cable 50 may be carried through a drive guide 68, which may be a pulley, with a channel or an eye which may be carried on a guide frame 66 such that the drive guides 68 are laterally disposed from the engagement of the drive means 50 with the drive mechanism. The drive guides 68 improve the articulation of the nozzle 10 and reduce the swinging force required for the operator to swing the leaf blower 52 in an arc from one side to the other. When the leaf blower 52 is swung, the drive belt 50 is pulled turning the drive mechanism, which turns the movable nozzle tip 10 in a direction opposite to that of the sweep of the arc.

In yet other embodiments, the drive mechanism may include a drive means guide 68, which may generally be formed in an arcuate bow shape and formed of a resilient material. The flexibility of the bow is selected to carry the drive belt 50 so that tension is maintained on the drive belt 50 in the event the operator 56 imparts a forward or a reward movement in the blower 52 as the blower 52 is swung from side to side. In addition, the drive belt 50 may also include some linear elasticity to maintain tension and orientation of the articulating nozzle 10.

In certain embodiments, the adjustment clip 60 may include a spring biased retraction mechanism that provides sufficient tension on the driving means 50 so that the nozzle 10 is oriented by the drive mechanism during normal sweeping of the blower 52 in an arc. The spring bias should be set so that there is tension relief in the driving means 50 in an over swing condition or in those instances where the articulating nozzle 10 has reached its lateral limits.

As will be appreciated, the gear ratio of the drive mechanism is selected so that the movable nozzle tip 10 moves the appropriate amount in order to have the high velocity airflow 58 directed in the desired convergent direction as the blower 52 is swung in an operating arc.

When the leaf blower 52 is oriented straight ahead, the movable nozzle tip 10 is also pointed straight. When the leaf blower 52 is swung away from center to the right, the articulating nozzle tip 10 is turned to the left the appropriate amount so the debris is blown in the same direction as when the leaf blower 52 was pointing straight forward. A similar movement occurs when the leaf blower 52 is swung to left, the movable nozzle tip 10 will be swung to the right. The ratio of leaf blower 52 movement to movable nozzle tip 10 movement can be adjusted by the selection of the gear ratios between the drive mechanism.

Alternatively, the drive mechanism may also be configured with a clutch, so that if for some reason the movement of the movable nozzle tip 10 is impeded the operator 56 can still swing the leaf blower 52. The clutch could be incorporated on the driven mechanism so that it may disengage tension from the drive belt 50. The clutch could also be used to set the central position quickly. By disengaging the driven pinion 4 from the drive belt 50, the leaf blower 52 can be pointed in the desired direction. Once the desired position is selected, the clutch can be engaged and the leaf blower 52 will use that position as the central position.

Also in the event the operator 56 wishes to defeat the function of the movable nozzle tip 10, the clutch can or drive mechanism can be disengaged from the drive belt 50. The adjustment clip 60 should be positioned on a segment of the drive belt 50 that does not go through the drive guides 68 during use, but should still be easily accessible to the operator 56, such as at the operator's side, and may be adjustable to fit either a left handed or right handed operator 56.

Parts of the invention may be produced using injection molding for plastic components, such as the fixed nozzle portion 54, the coupling sleeve 16, and the movable nozzle portion 10. The drive mechanism could be molded from self-lubrication polymers to reduce friction and minimize wear. The pivots tabs bushings and the axle 13 could be metallic pieces or be incorporated as plastic features in the molded components to which they otherwise would be attached. The boot should preferably be flexible rubber or thermoplastic elastomer. All components should be resistant to UV and exposure to grass and leaves and gasoline.

The drive belt 50 can be a toothed rubber belt with fiber reinforcements. The drive belt 50 could include a toothed belt portion having a length corresponding to a left and a right lateral sweep of the blower 52 and articulating nozzle tip 10. The drive belt 50 may also be formed from a cable or other type of drive belt system, as long as the drive mechanism was configured to mate and cooperatively move with it. If there is electrical or hydraulic or pneumatic power, the movable nozzle tip could be moved by servos or bow den cables to achieve the same end.

The present invention may be incorporated into the design of a new leaf blower 52 or retrofitted to the stationary tip 54 of an existing leaf blower 52. The present invention would permit any blower 52 to efficiently move a large quantity of debris in the desired direction. It would alleviate excessive movement by the operator 56 that is presently required to chase the moving debris pile around, since the movable tip nozzle 10 would always oriented in the desired direction.

Additionally, the articulating nozzle 10 of the present invention could be used in other types of equipment that an operator 56 swings in an arc so as to translate the tip position to maintain a straight line, such as moving agricultural products, or snow, or dust, or raw materials. The concept could also be applied to a weed trimmer so that the blade of the trimmer always pointed the same direction when the unit was swung. The articulating nozzle could be used to keep the spray head of a spray nozzle (paint, chemicals) perpendicular to the surface being treated, even though the nozzle was swung in an arc.

It should be understood, of course, that the foregoing relates to exemplary embodiments of the invention and that modifications may be made without departing from the spirit and scope of the invention as set forth in the following claims.

What is claimed is:

1. An articulating nozzle for a blower, comprising:
   a movable nozzle configured to be pivotally connected to a fixed nozzle end of the blower;
   a drive mechanism operably coupled to the movable nozzle to impart a deflection of the movable nozzle responsive to a swinging arc movement of the fixed nozzle end in a direction opposite that of the swinging arc movement of the fixed nozzle end of the blower wherein the movable nozzle remains oriented to direct an airflow in a convergent manner.

2. The articulating nozzle of claim 1, further comprising:
   a driving means operatively coupled to the drive mechanism, the driving means configured to be attached to a left side and a right side of a blower operator.

3. The articulating nozzle of claim 2, wherein the driving means comprises a flexible drive belt.

4. The articulating nozzle of claim 2, wherein the driving means comprises a drive cable.

5. The articulating nozzle of claim 2, further comprising:
   a coupling sleeve wherein the movable nozzle is pivotally connected to a forward opening of the coupling sleeve and an aft opening of the coupling sleeve is configured to attach to the blower.

6. The articulating nozzle of claim 2, further comprising:
   an adjustment clip configured to adjust a length of the driving means.

7. The articulating nozzle of claim 6, wherein the adjustment clip further comprises a spring biased retractor.

8. The articulating nozzle of claim 1, wherein the drive mechanism is configured to orient the movable nozzle at a point of convergence throughout the swinging arc movement of the blower.

9. A blower nozzle adapter, comprising:
   a coupling sleeve having a first end and a second end, the first end configured to connect to a fixed nozzle of an operator carried blower tool;
   a movable nozzle pivotally connected to the second end of the coupling sleeve; and
   a drive mechanism operable by a lateral swinging arc movement of the first end of the coupling sleeve to impart a deflection of the movable nozzle in a direction opposite that of the lateral swinging arc movement to orient the movable nozzle at a point of convergence as the first end of the coupling sleeve is operated in the lateral swinging arc movement.

10. The blower nozzle adapter of claim 9, further comprising:
    a drive means configured to be operably connected between the drive mechanism and an attachment at a left side and a right side of an operator of the blower tool.

11. The blower nozzle adapter of claim 10, wherein the drive means comprises a belt.

12. The blower nozzle adapter of claim 10, wherein the drive means comprises a cable.

13. The blower nozzle adapter of claim 10, further comprising:
    a tension relief means for relieving the tension in the drive means at a limit of travel of the movable nozzle.

14. The blower nozzle adapter of claim 13, wherein the tension relief means comprises a spring biased retractor operably coupled to at least one end of the drive means.

15. The blower nozzle adapter of claim 13, wherein the tension relief means comprises a resilient arcuate drive guide.

16. The blower nozzle adapter of claim 15, wherein the drive mechanism comprises:
    a first drive gear carried on a pivot pin interconnecting the movable nozzle and the coupling sleeve:
    at least one second drive gear carried on a rod extending from an intermediate portion of the coupling sleeve; and
    a pulley carried on the pivot pin and operatively coupled to the at least one first drive gear.

* * * * *